US011084752B2

(12) United States Patent
Dumenil et al.

(10) Patent No.: US 11,084,752 B2
(45) Date of Patent: Aug. 10, 2021

(54) METHOD FOR BREAKING OUT A SHEET OF GLASS

(71) Applicant: SAINT-GOBAIN GLASS FRANCE, Courbevoie (FR)

(72) Inventors: Thierry Dumenil, Margny les Compiegne (FR); Dominique Bureloux, Ognes (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/680,904

(22) Filed: Nov. 12, 2019

(65) Prior Publication Data

US 2020/0148578 A1 May 14, 2020

Related U.S. Application Data

(63) Continuation of application No. 15/328,170, filed as application No. PCT/FR2015/052043 on Jul. 23, 2015, now abandoned.

(30) Foreign Application Priority Data

Jul. 24, 2014 (FR) ........................ 1457171

(51) Int. Cl.
*C03B 33/04* (2006.01)
*C03B 33/023* (2006.01)
*C03B 33/033* (2006.01)

(52) U.S. Cl.
CPC .......... *C03B 33/04* (2013.01); *C03B 33/0235* (2013.01); *C03B 33/033* (2013.01)

(58) Field of Classification Search
CPC .... C03B 33/0235; C03B 33/033; C03B 33/04
See application file for complete search history.

(56) References Cited

U.S. PATENT DOCUMENTS

| 2,302,174 | A |   | 11/1942 | Boicey et al. |
|-----------|---|---|---------|---------------|
| 3,169,683 | A |   | 2/1965  | Pierce        |
| 3,543,979 | A |   | 12/1970 | Hamer         |
| 3,717,290 | A |   | 2/1973  | Bentley       |
| 4,278,193 | A |   | 7/1981  | Pereman       |
| 4,487,350 | A |   | 12/1984 | DeTorre       |
| 4,948,025 | A | * | 8/1990  | Lisec ............... C03B 33/033 225/104 |

(Continued)

FOREIGN PATENT DOCUMENTS

EP          1 647 534 A1   4/2006
JP          2005-015238 A  1/2005

(Continued)

OTHER PUBLICATIONS

International Search Report as issued in International Patent Application No. PCT/FR2015/052043, dated Oct. 30, 2015.

*Primary Examiner* — Stephen Choi
(74) *Attorney, Agent, or Firm* — Pillsbury Winthrop Shaw Pittman LLP

(57) ABSTRACT

The method includes tracing a score line on the surface of the glass, using a scoring tool, and breaking out using a local pressure system applied on the opposite face and opposite the score line, the local pressure system being moved and pressed along the score line on the opposite face.

11 Claims, 9 Drawing Sheets

(56) References Cited

U.S. PATENT DOCUMENTS 5,165,585 A * 11/1992 Lisec .................... C03B 33/033
225/105
2005/0180036 A1    8/2005  Maissen
2006/0081673 A1    4/2006  Schenk
2014/0094948 A1    4/2014  Peyrude et al.

FOREIGN PATENT DOCUMENTS

JP      2007-076965 A     3/2007
JP      2013-216508 A     10/2013
WO   WO 2012/164200 A1    12/2012

* cited by examiner

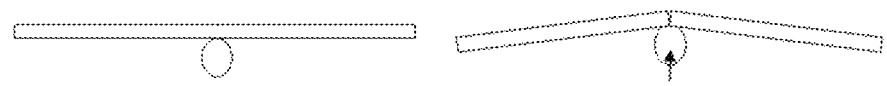
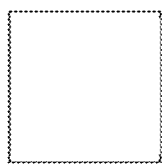 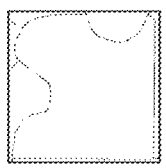 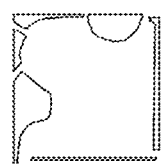 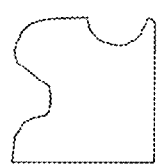
Fig.1a --Prior Art--  Fig.1b --Prior Art--
Fig.2a --Prior Art--  Fig.2b --Prior Art--  Fig.2c --Prior Art--  Fig.2d --Prior Art--
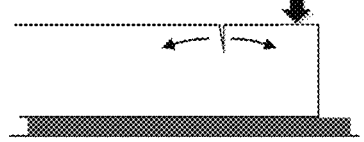
Fig.3a --Prior Art--
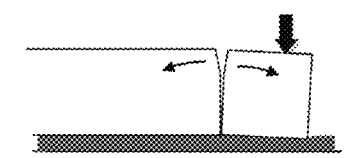
Fig.3b --Prior Art--
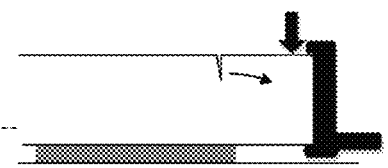
Fig.3c --Prior Art--
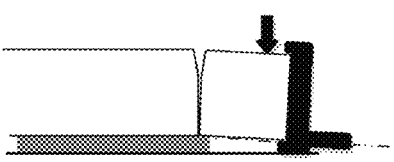
Fig.3d --Prior Art--

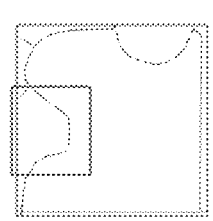
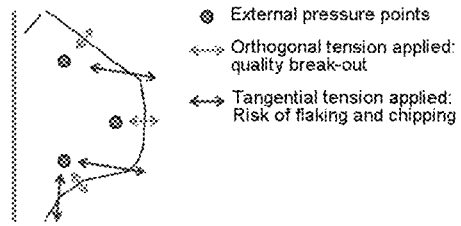
Fig.4
--Prior Art--
Fig.5
--Prior Art--
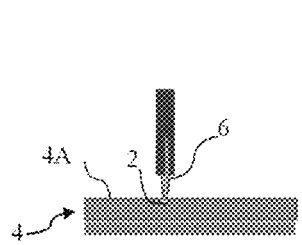
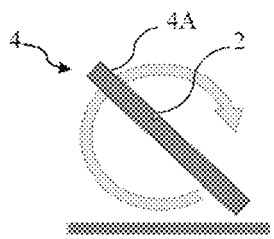
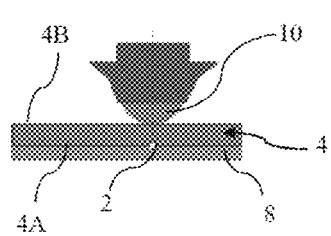
Fig.6a
Fig.6b
Fig.6c

METHOD FOR BREAKING OUT A SHEET OF GLASS

CROSS-REFERENCE TO RELATED APPLICATIONS

This application is a continuation of U.S. application Ser. No. 15/328,170 filed Jan. 23, 2017, which is the U.S. National Stage of PCT/FR2015/052043 filed on Jul. 23, 2015, which in turn claims priority to French patent application number 1457171 filed Jul. 24, 2014. The content of these applications are incorporated herein by reference in their entireties.

The present invention relates to the field of breaking out a sheet of glass, more particularly of breaking out a complex shape from a sheet of glass.

To achieve such a break-out, there are two successive operations:
- a preliminary operation of tracing one or more surface fissures on the surface of the glass using, for example, a glass-cutting wheel or a laser; these fissures form lines at the contours of the shape; this operation is known as the "scoring" operation;
- an operation of spreading the initial surface fissure through the thickness of the sheet of glass; this operation is known as the "breaking out" operation and allows the shape that is to be cut out to be separated from the initial specimen of glass known as the primitive.

At the present time there are two techniques for breaking out glass, used according to the complexity of the volume that is to be cut out:

For simple shapes with straight edges that do not penetrate inside the shape (no concavity on the shape), it is possible to use a rectilinear reverse breakout technique illustrated in FIGS. 1a and 1b. This involves making a rectilinear cross score, which means to say scoring from one edge to the other (FIG. 1a), then placing the entire fissure in extension by lifting the sheet of glass along the entire length of the fissure, using a bar (FIG. 1b) or one or more point contacts.

Nevertheless, this method cannot be used for cutting out complex shapes. For shapes with non-rectilinear contours, the starting point is a sheet of glass of dimensions greater than the shape that is to be cut out. This sheet is known as the primitive and is generally in the shape of a trapezium. The various stages of cutting out are illustrated in FIGS. 2a-2d.

The starting point is a primitive in the shape of a square (FIG. 2a), a rectangle or a trapezium.

The contour of the shape that is to be cut out is traced (FIG. 2b) for example using a glass-cutting wheel. Additional scores in the form of straight segments are positioned around the periphery of the shape that is to be cut out. These segments are referred to as the relief cuts and allow that part of the primitive that is situated outside of the shape that is to be cut out to be broken out correctly.

Using a number of steps to break out that part of the primitive that is situated outside of the shape that is to be cut out causes various pieces referred to as "offcuts" being obtained around the complex shape that is to be cut out (FIG. 2c).

The shape that is to be cut out is then isolated from the offcuts of the primitive (FIG. 2d).

When cutting out complex shapes as described here, the breaking out is performed using a technique of locally bending the initial fissure by applying pressure to the offcut or alternatively by taking hold of the offcut. The bending is applied by a lever-arm mechanism pressing against the sheet of glass, on the outside of the shape and at a limited number of points, on a hard or soft covering.

FIGS. 3a to 3d are diagrams in cross section of the breaking out of a sheet of glass by applying bending to an initial fissure of complex shape by bending the part external to the shape that is to be cut out.

FIGS. 3a and 3b relate to the circumstance in which breaking out is performed on a soft belt. Force is applied to the offcut by pressing on it until it breaks and the offcut is separated.

FIGS. 3c and 3d relate to an example of breaking out on a hard belt. The sheet of glass is positioned with an overhang so that a force applied to the offcut by pressure or by gripping allows the sheet of glass to be deformed until it breaks.

Nevertheless, these techniques have a number of disadvantages.

In the case of FIGS. 3c and 3d there is a sacrificial area of glass lost through the need to create the overhang for breaking out.

Furthermore, there may be problems with the quality of the cutting-out of the complex shapes because when pressure is applied to the offcut it is not generally possible to create a bending stress at every point on the score line. This is notably the case with re-entrant shapes (concave portions on the shape that is to be cut out). In such cases it is possible to introduce bending into the glass at the entrance to the concave part, but as soon as the fissure has spread a little, and before the tool applying the pressure can be removed, the field of stresses at the head of the fissure is modified by the geometry of the score line. The pure bending that was applied at the start of the concave part quickly becomes a shear stress and causes chipping. In the case of shapes with a small radius, the fissure may spread beyond the initial score line and generate scrap. Such a situation is indicated schematically in FIGS. 4 and 5.

Adjusting the pressure points may solve this problem but this remains a difficulty.

What is more, this limits the complex shapes that can be achieved, particularly in the case of geometries with small concave radii of curvature (deeply curved regions) where it is difficult to site a pressure point appropriately.

These difficulties make breaking out concave shapes particularly tricky. If the radius of curvature is small, adjusting the positions of and loads at the pressure points becomes a lengthy and tricky operation. In production, the breaking out of these geometries is often sensitive to the slightest variation in working parameters and may give rise to a great deal of scrap. Moreover, the propensity of the stress field at the head of the fissure to transform from a pure bending mode to a shear mode is exacerbated as the thickness of the glass increases. Re-entrant shapes are thus reputed to be very difficult to achieve with glass 3.85 or 5 mm thick.

It is an object of the invention to make cutting complex shapes from sheets of glass easier. To this end, one subject of the invention is a method for breaking out a complex shape from a sheet of glass, comprising:
- a step of tracing a score line on the surface of the glass, using a scoring tool;
- a step of breaking out using a local pressure means applied on the opposite face and opposite the score line, the local pressure means being moved and pressed along the score line on said opposite face.

This method makes it possible to reduce the sacrificial area of glass between two volumes. It is even conceivable for several components to be cut from the same large-sized sheet of glass, with components which may touch at certain points. It then becomes conceivable to cut with maximum imbrication of shapes and a very substantial reduction in offcuts.

This is because there is no need to create a square, rectangular or trapezoidal primitive similar to the complex shape that is to be obtained. It is possible to cut the complex shape directly from the large-format sheet from which several complex shapes may be cut. This means that the positions of the complex shapes in the sheet of glass can be optimized thereby reducing the cost of the "glass" raw material.

It is also possible to create primitives of which certain edges are ready to shape and of complex shape while the shaping of the other edges is performed during the second step of scoring. In general, this means making all or part of the edges of complex shape right from the first step of scoring on the production line.

It is also possible to shape all the edges during the second step of scoring, which means to say to continue to score in a first phase primitives the edges of which are not ready to shape, but providing widths of "trim" that are not as great as they were before.

More complex cutouts may also be achieved, particularly "re-entrant" cutouts, and cutouts for thick glass, and with good yield.

Because the adjusting of the position is connected with the contour, adjusting the position of the pressure points is also simpler.

Furthermore, this breaking out technique can be incorporated into an existing line.

Provision may be made for a counter-force to oppose the force with which the local pressure means is pressed during the breaking-out step.

According to one embodiment, a planar-support means is positioned on the score line side, facing the local pressure means during the breaking-out step.

In this case, the planar-support means forms a counter support generating a counter force that opposes the force with which the local pressure means is pressed during the breaking-out step.

According to an alternative form, the counter force may result from the weight of the sheet of glass itself, when this weight is sufficiently great.

According to one embodiment, the tracing step and the breaking-out step are performed without turning the sheet of glass over in between. In other words, according to one example, the score line is produced from the top at the surface of the glass and the local pressure means is applied from the bottom to the opposite face of the glass, or vice-versa. The sheet of glass is not turned over between the two steps.

According to other particular embodiments, the method also has one or more of the following features considered alone or in any technically feasible combination:
the local pressure means is mounted so that it can roll so as to roll along the sheet of glass;
the local pressure means is a ball or a roller, preferably rounded;
the local pressure means is applied with a pressing force that is chosen according to the local radius of curvature of the shape that is to be cut out;
the local pressure means is pressed continuously along the score line;
the local pressure means is pressed with a force that has at least one periodic component;
the method uses a suction table as a planar-support means, the suction table supporting the sheet of glass by suction on the top face of the sheet of glass during the breaking-out or scoring step;
the method is used to cut at least two imbricated and/or tangential complex shapes from the same sheet of glass.

Another subject of the invention is a method for manufacturing a plurality of glazings of complex shape from a large-sized rectangular sheet of float glass having at least one dimension corresponding to the width of the ribbon of float glass from which it is produced, using the method as claimed in any one of the preceding claims to cut out at least part of said glazings.

According to one particular embodiment, the method of manufacture comprises:
on a first workstation for scoring said sheet of glass, a step of tracing at least one score line corresponding to at least one ready to shape edge of the glazings,
a first breaking-out step,
on a second scoring workstation, a step of tracing at least one score line corresponding to at least one other ready to shape edge of the glazings;
a second breaking-out step.

According to another particular embodiment, the method comprises:
on a first workstation for scoring said sheet of glass, tracing score lines corresponding to all of the ready to shape edges of the glazings,
a step of breaking out said ready to shape edges.

According to some particular embodiments, the method of manufacture also has one or more of the following features considered alone or in any technically feasible combination:
the precision with which the score lines are traced on the first scoring workstation is +/−0.2 mm;
the second scoring workstation incorporates a focusing step accurate to +/−0.1 mm;
at the first scoring workstation, the score line is a straight score line running across the sheet of glass from one edge to the other;
at the first scoring workstation, the score line forms a ready to shape edge of several glazings on one same side of the score line;
at the first scoring workstation, the score line also forms a ready to shape edge of several glazings on the other side of the score line;
on each side of the score line, the ready to shape edges are the same edge of the glazings;
on each side of the score line, the ready to shape edges are the opposite edges of the glazings;
the first breaking-out step forms a primitive for each glazing that is to be manufactured, the second breaking-out step forming the glazing which is ready for edging;
the method comprises at least one additional scoring workstation, with at least one additional breaking-out step;
the method comprises a step of edging the glazing after the second breaking-out step;
the edging is grinding;
two grinding steps are performed;
the large-format sheet of glass has at least one dimension of at least 2.9 m.

Another subject of the invention is a machine for breaking out a complex shape from a sheet of glass, comprising:

a scoring tool and means for automatically moving said tool in such a way as to create a score line perpendicular to the surface of the glass on a first face of a sheet of glass;

a local pressure means and means for automatically moving the local pressure means and/or the sheet of glass relative to the other, the machine being configured to press the local pressure means against the opposite face to the first face of the sheet of glass and move it opposite and along the score line so as to break out the complex shape.

According to one particular embodiment, the breaking-out machine further comprises a planar-support means against said first face of the sheet of glass, opposite the local pressure means.

BRIEF DESCRIPTION OF THE DRAWINGS

The invention will be better understood from reading the following description, given solely by way of nonlimiting example, with reference to the following figures:

FIGS. 1a-1b schematically describe a rectilinear reverse breakout technique;

FIGS. 2a-2d schematically describe the cutting of a glass sheet having a complex shape;

FIGS. 3a-3d schematically describe in cross section the breaking out of a glass sheet on a soft belt and on a hard belt;

FIGS. 4-5 schematically describe the cutting of a glass sheet having a complex shape;

FIGS. 6a-6c are schematic views in vertical section of various steps of a method according to one particular embodiment of the invention;

FIGS. 6a-6c schematically illustrate a method according to one particular embodiment of the invention, consisting first of all of a step of tracing a score line 2, which means to say of creating a fissure on a first face 4A of the sheet of glass 4, followed by a step of turning the sheet of glass over for the purposes of a subsequent step of applying local pressure opposite the fissure, on the opposite face 4B to the first face. The traced score line corresponds for example to the contour of the complex shape that is to be cut out, without relief cuts.

Figure 7A:
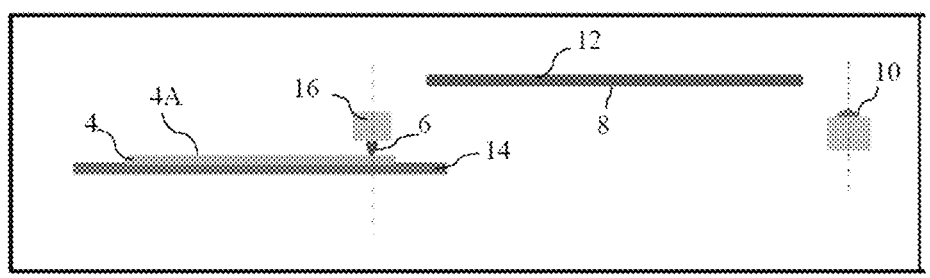
FIGS. 7a-7c, 8a-8c, 9a-9c and 10a-10c are also schematic views in vertical section of the steps performed by four different breaking-out machines.

Note that throughout the text a "complex shape" is intended to mean a curved line, or a succession of lines at least some of which are non-rectilinear, or rectilinear lines with changes in direction forming at least one concave part.

Two shapes that are imbricated means that a convex part of one encroaches into a concave part of the other, i.e. the contour of the two shapes cannot be separated by a straight line.

Two shapes are understood to be tangential when they have a part of their contour in common.

Note too that the sheet of glass to be cut is planar.

The score line is traced for example using a glass-cutting wheel 6 or any other suitable scoring tool such as a laser for example. The score line 2 is a fissure intended to allow breaking out along this line during the breaking-out step. This then is a partial cut, i.e. a cut through just part of the thickness of the sheet of glass. This is what is meant by a "score line" throughout this text.

With this method, as explained above, it is possible to eliminate all or some of the relief cuts used in the method of the prior art. This is because the relief cuts will potentially be needed only to open the contour in order to extract the shape rather than being needed to facilitate the breaking out of the complex shapes.

As illustrated in FIG. 6c, the first face 4A of the sheet of glass 4, on which face the score line 2 has been made, is pressed against a planar-support surface 8. This for example is a soft belt. The deformability of the planar-support surface 8 is chosen in such a way as to control the field of stresses applied by the local pressure means. Controlling the field of stresses allows control over the length over which the fissure spreads. The objective is for the fissure to spread to a predetermined length according to the shape that is to be cut out. The smaller the local radius of curvature, the smaller will be the chosen length for the fissure. If the fissure spreads too rapidly, the surface will need to be chosen to be less deformable or the pressure applied will need to be lower. If the fissure spreads too slowly, a more deformable surface or higher pressure will need to be chosen.

For a sheet of standard soda-lime-silica glass of the "Planilux" type 3.15 mm thick, the parameters were as follows:

Scoring Parameters:
Cutter wheel: angle 150°, width=1 mm, diameter: 5 mm
Cutter wheel speed: 100 m/min
Force applied to the glass=50 N
Wheel penetration into the glass: 4/100 mm
Glass thickness: 3.15 mm
Reverse breakout parameters:
Breakout tool: wheel type, diameter: 5 mm, width: 1 mm
Tool speed: 30 m/min
Force applied to the glass=70 N
Hardness of the covering of the planar-support means: felt belt hardness: 45-52 shore.

The local pressure means 10 is, for example, a ball of any suitable type, or another local pressure means of any suitable type, for example a roller, preferably a roller of toric shape. The ball for example has a diameter of 1 mm. As an alternative, the diameter is chosen of any suitable type, notably up to 10 or even 20 mm.

The local pressure means 10 is preferably chosen to be rigid, for example made of steel or a suitable plastic.

The local pressure means 10 is moved along the score line, along the entire length of the score line, preferably with pressure being continuously applied, for example of constant intensity. However, as an alternative, pressure is applied continuously but with varying intensity, the intensity for example being chosen according to the local radius of curvature of the shape to be cut out and, for example, supplemented by a periodic variation in intensity, namely vibrating pressure. As a further alternative, pressure is applied discontinuously to the sheet of glass.

The local pressure means is moved relative to the sheet of glass. Note, however, that, as an alternative, it is the sheet of glass that is moved, or both. In general, there is a relative movement of the local pressure means 10 with respect to the sheet of glass 4.

The planar-support surface 8 is, for example, formed by a table and therefore by a continuous planar surface. However, as an alternative, the planar-support surface 8 could be not continuous. It could for example consist of a number of planar-supports obtained for example using pieces of table. What is important is that a planar support 8, namely a support at least twice as wide as the pressure applied by the local pressure means, be provided opposite the local pressure means 10, the reason for this being in order to obtain a clean break.

Note too that the turning-over step is optional. It is possible for example to use a suction table to lift up the sheet of glass 4 and thus press the local pressure means 10 against it from underneath, the first face 4A of the sheet of glass then lying against the suction table. This is explained in greater detail hereinbelow.

FIGS. 7a-7c, 8a-8c, 9a-9c and 10a-10c schematically illustrate four different types of machines for implementing the method.

Figure 7B:
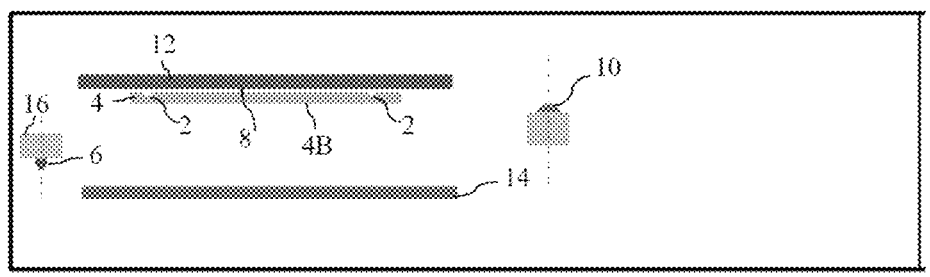
Figure 7C:
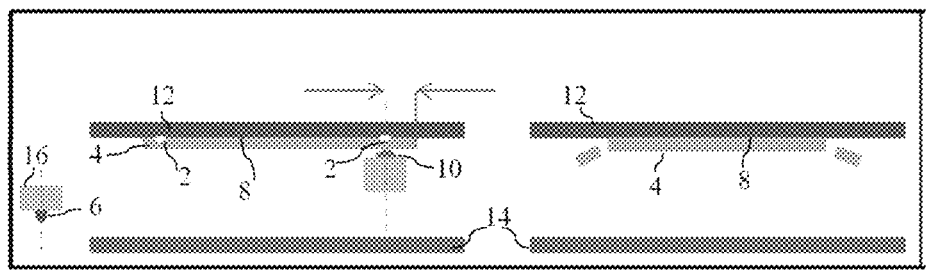

The machine of FIGS. 7a-7c uses a suction table 12.

A sheet of glass 4 is conveyed as far as a cutting table 14 (FIG. 7a). A standard cutting machine 16 can therefore be used for creating a score line 2 along the contour of the complex shape that is to be obtained.

The suction table 12 is, for example, brought in over the cutting table 14 as illustrated in FIG. 7b, so as to apply suction to the sheet of glass 4 via the first face 4A thereof.

In a third step (FIG. 7c), the local pressure means 10 is brought against the opposite face 4B of the sheet of glass 4, opposite the score line 2.

The suction table 12 may also be configured so that the offcuts fall off under gravity whereas the complex shape or shapes that have been cut out remain attached by suction to the suction table 12 and are carried further thereby, as illustrated by the right-hand diagram in FIG. 7c.

However, it will be appreciated that this is simply an example of a machine and that alternative forms of any suitable type are conceivable.

The machine has at least one computer and one memory in which machine control programs are stored. The programs are able to control the machine of FIGS. 7a-7c and more particularly to control the scoring tool 6, the suction table 12 and the local pressure means 8. The same is true of the other machines in FIGS. 8a-8c, 9a-9c and 10a-10c.

The machine of FIGS. 7a-7c has the advantage of not requiring the sheet of glass 4 to be transferred on a conveyor prior to breaking out and of thus avoiding a geometric readjustment in order to determine the position of the score line 2, as well as saving space.

Figure 8A:
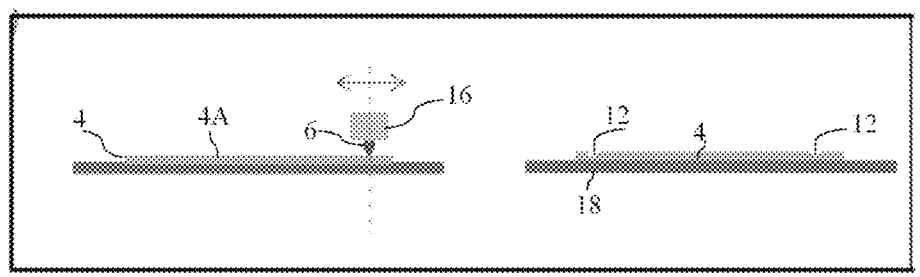
Figure 8B:
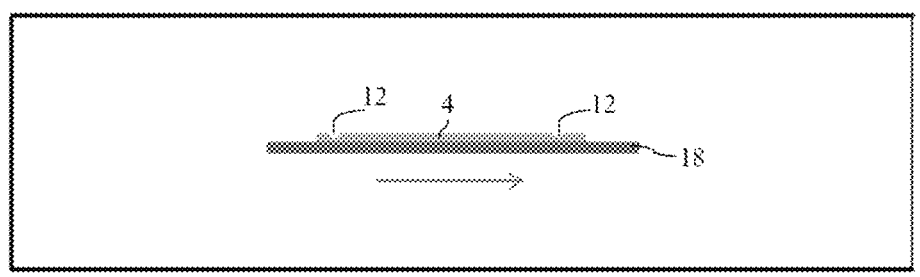
Figure 8C:
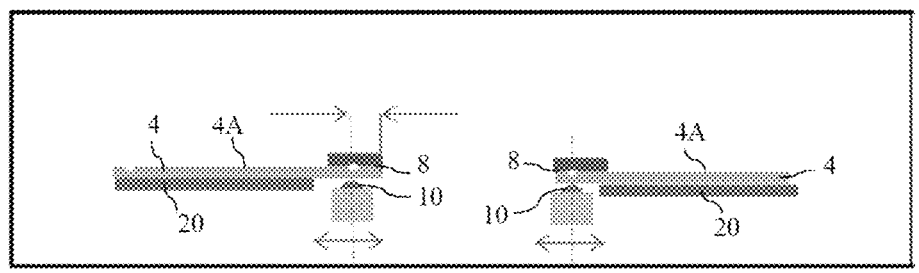

FIGS. 8a-8c illustrate a machine which itself comprises a conveyor 18 for transferring the sheet of glass from the location at which it is scored to the location at which it is broken out.

The scoring step in FIG. 8a is similar to that of FIG. 7a. FIG. 8b illustrates the transfer using the conveyor 18 to the breaking-out location.

FIG. 8c illustrates the breaking-out step. In order to avoid turning the sheet of glass 4 over, a planar-support surface 8 is applied against the first face 4A. The opposite face 4B against which the local pressure means 10 is pressed is itself overhanging so that the region corresponding to the score line 2 is clear of the support table 20 bearing the sheet of glass 4 by what is said to be its opposite face 4B.

As an alternative, it is of course possible to plan to turn the sheet of glass 4 over as explained hereinabove in relation to the method. However, a machine according to FIG. 8c also allows the rigidity and hardness of the planar-support material 8 to be chosen and adapted more easily.

Figure 9A:
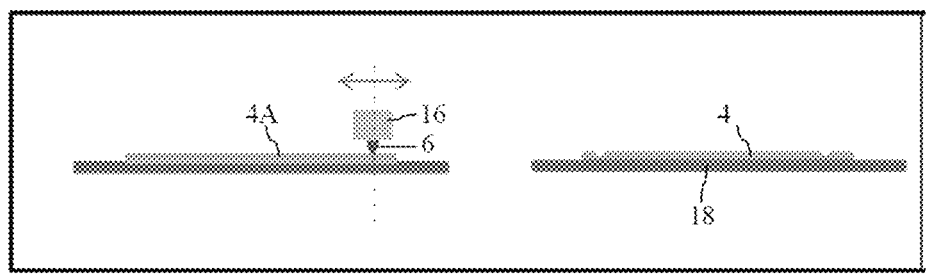
Figure 9B:
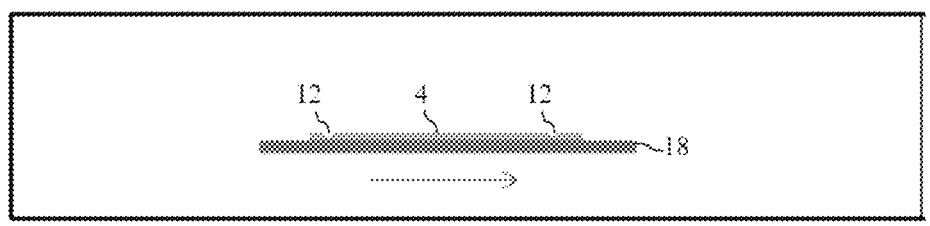
Figure 9C:
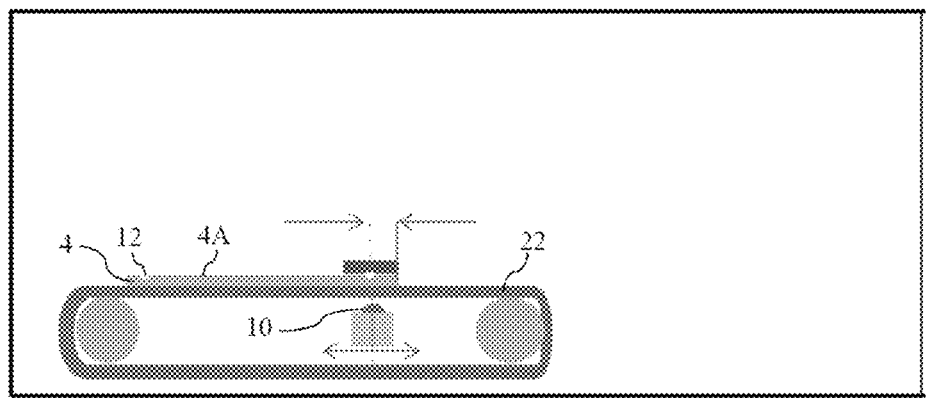

FIGS. 9a-9c illustrate an alternative form of the example of FIGS. 8a-8c, in which alternative form breaking out is performed through a soft conveyor belt 22 that conveys the sheet of glass. It should indeed be noted that the local pressure means 10 does not necessarily need to be in direct contact with the glass.

Note too that, as an alternative to FIGS. 8a-8c and 9a-9c, transfer may be performed by a suction table 24. This incidentally is what FIG. 10a illustrates.

Figure 10A:
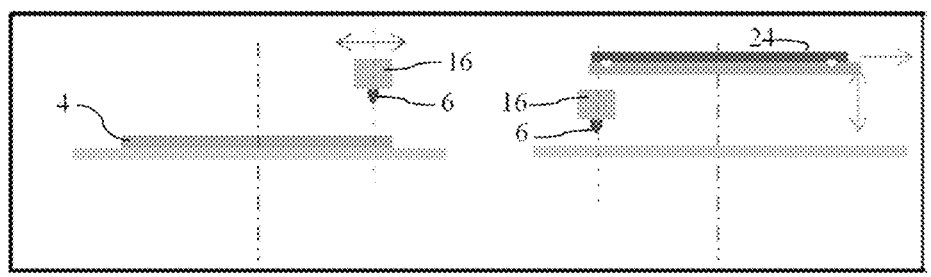
Figure 10B:
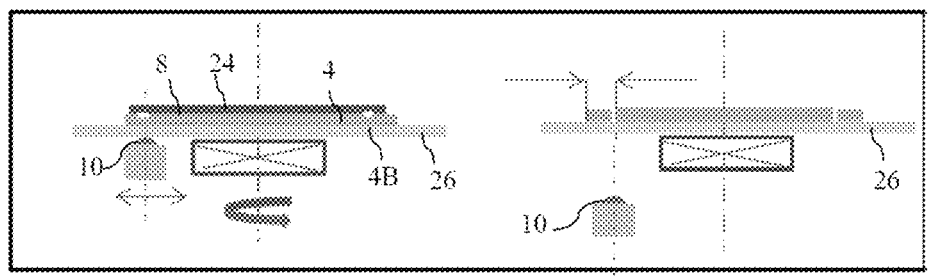
Figure 10C:
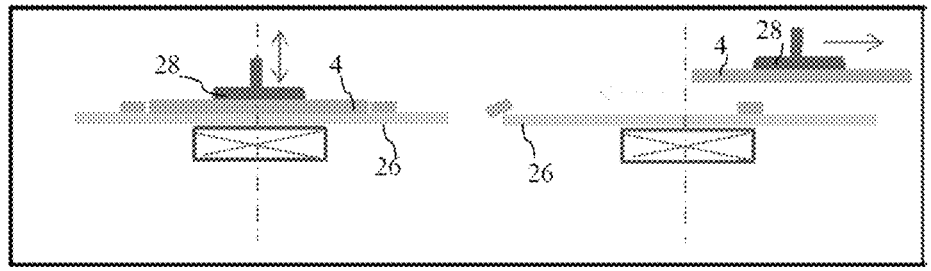

However, the machine of FIGS. 10a-10c also differs from the preceding ones for other reasons. The main difference is that the sheet of glass is turned during the breaking-out step, while remaining in its plane, as illustrated by FIG. 10b. This is a rotation about a normal to the overall plane of the sheet of glass.

Furthermore, in FIG. 10b, the support plate 26 supporting the sheet of glass 4 is flexible enough that the local pressure means 10 can press against the opposite face 4B through the support plate 26 and thus break the complex sheet of glass along the contour of the complex shape. A planar-support means 8 is pressed firmly against the first face 4A of the sheet of glass, in a similar way to FIG. 8c.

The local pressure means 10 is, for example, mounted with the ability to move in just two dimensions, thanks to the rotation of the sheet of glass 4.

FIG. 10c illustrates the separation of the complex shape by means of a suction table 28. As an alternative, it could use another means of any suitable type.

The remainder of the description seeks to explain the advantages of the invention in terms of the possible configurations of the production line.

Before that, the following should be borne in mind.

The cutting out of glazings of complex shape, i.e. for example automotive vehicle glazing, is generally performed in two stages starting from a "large-format" sheet of glass also known as "PLF" (which stands for "Plateau Large Format") or DLF glass.

These are sheets of glass of which at least one dimension corresponds to the width of the ribbon of float glass from which they are derived. "PLFs" are obtained directly by cross-cutting the ribbon of float glass. The width of the PLFs corresponds to the width of the ribbon of float glass. Their length corresponds to the length of ribbon cut. DLFs are smaller sheets of glass, of which the length itself corresponds to the width of the ribbon of float glass. DLFs are obtained directly by cutting the ribbon of float glass but with a cut length of ribbon that is shorter than the width of the ribbon of float glass, or alternatively are obtained by cutting the PLF transversely to the length thereof. Thus, in practice, PLFs have minimal dimensions of at least 2.9 m by at least 4.7 m and DLFs have dimensions of at least 2.9 m by at least 1.3 m.

Figure 11:
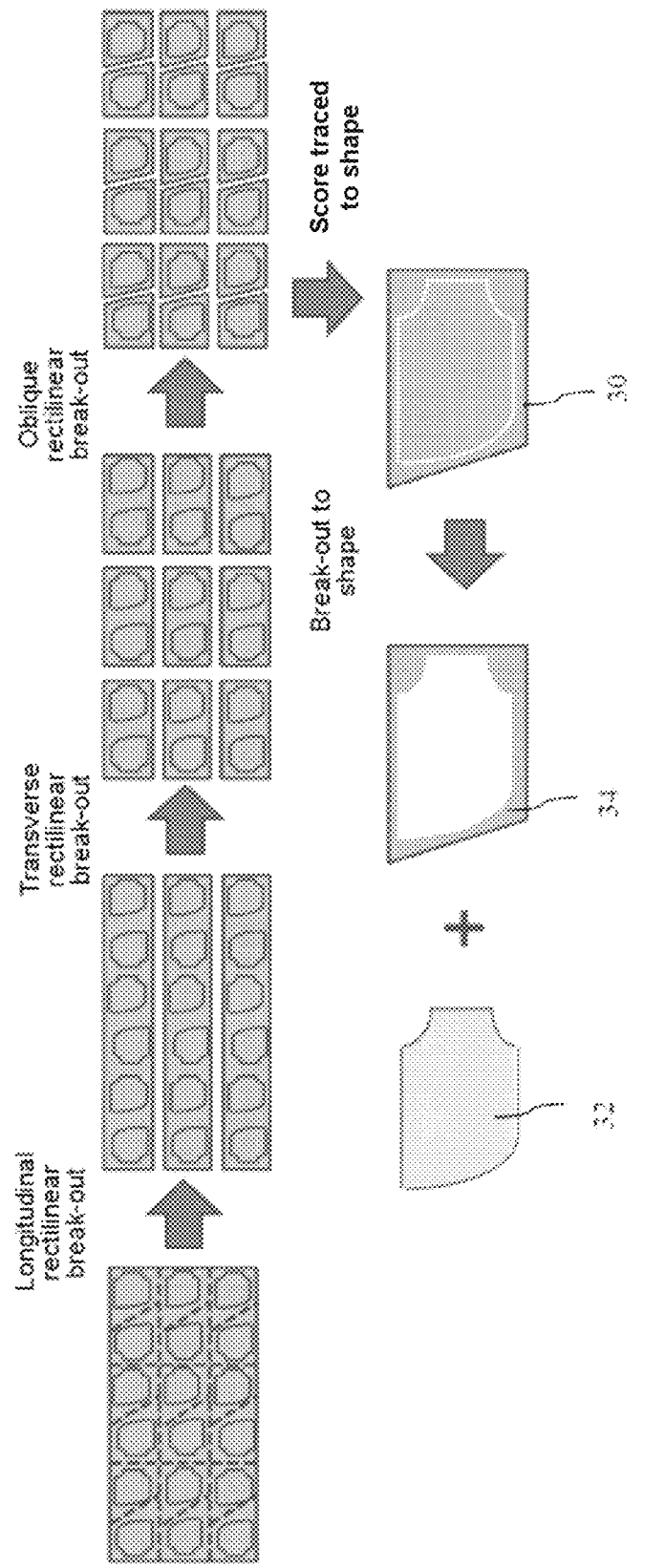
FIG. 11 illustrates one example of a design of cutout permitted by the invention according to a first example of a production line, the white lines representing the edges along their ready to shape contour and the dotted lines representing the tracing of the score lines during the first step of scoring on the line.

To manufacture glazing of complex shape, subsequent scoring steps are needed. Generally sheets of glass 30 of rectangular or trapezoidal shape and known as "primitives" are first of all cut from the PLFs or DLFs. These are sheets of glass of which the shape is a polygon containing the definitive glazing of complex shape 32 that is to be produced, leaving all around the periphery a "trim" 34 that is sufficient for breaking out. This is what is illustrated in FIG. 11.

In a second stage, the glazing that is to be edged is cut to shape at a second scoring workstation which means to say that the "trims" 34 are cut off over the entire perimeter of the primitive 30 so that the edges of the glazing 32 are now ready for edging. For that, a number of score lines are, for example, created as illustrated in FIGS. 2a-2d for an example of a square primitive. Edging consisting in grinding is then performed later. The primitives 30 are cut from the PLFs or DLFs at a first scoring workstation while the ready-to-shape glazings 34 are shaped at a second scoring workstation. At each scoring workstation:

the score lines are traced; and
the glass is broken out along the score lines.

Figure 12A:
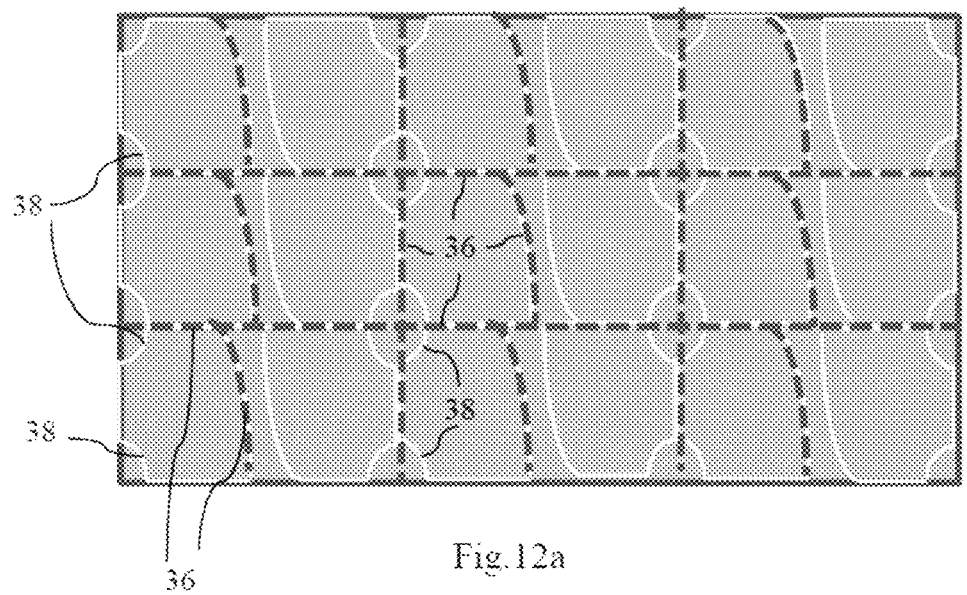
FIGS. 12a and 12b are views similar to FIG. 11 for another example of a production line.
Figure 12B:
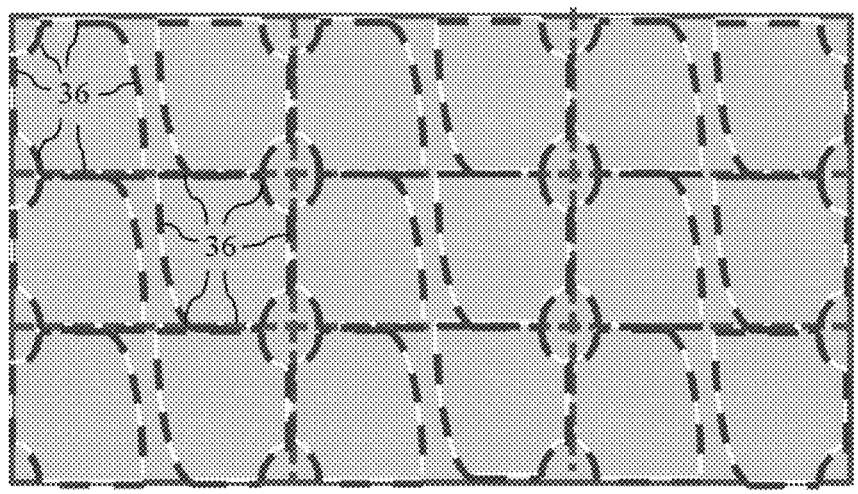

FIGS. 12a-12b illustrate examples of designs of cutout in which the continuous lines represent the shape to be cut out which is ready for shaping while the broken lines represent the score lines made at the first scoring workstation.

As illustrated by FIGS. 12a-12b, one advantage of the invention is that it allows at least some edges of complex shape to be cut at the first scoring workstation, i.e. at the workstation that cuts out the primitive 30. Cutting edges that are ready to shape at the first scoring workstation allows the amount of offcut to be reduced by avoiding the need to provide "trims" along these edges.

In the case of FIG. 12a, certain edges 36 of complex shape only are cut to their complex shape while others 38 will not be cut to shape until the second scoring step at the second scoring workstation.

In the example of FIG. 12b, the cutting to the shape which is ready for edging of all the contour of the glazing is carried out at the first scoring workstation (the entire contour is in a broken line 36).

Figure 13A:
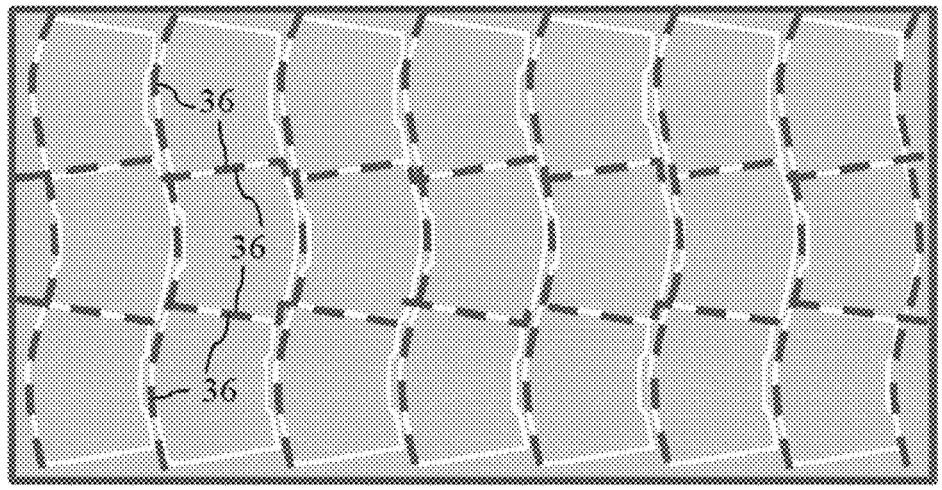
FIGS. 13a-13b are views similar to FIG. 11 for another example of a production line.
Figure 13B:
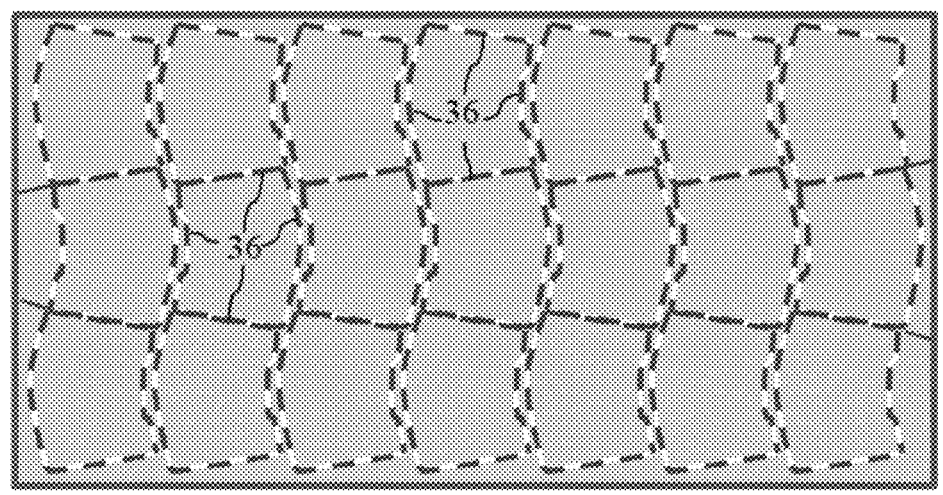

FIGS. 13a-13b illustrate another advantage of the invention, namely that it allows complex shapes that are to be cut out to be imbricated. Such a configuration will also reduce offcuts, as will be appreciated by studying FIGS. 13a and 13b.

Furthermore, cutting to the shape which is ready for edging may, as explained hereinabove in respect of FIGS. 12a and 12b, begin right from the first scoring step at the first scoring workstation. In FIG. 13a, two of the edges 36 are cut at the first scoring workstation, known as the "primitives" scoring workstation even though these are no longer primitives in the strict sense of the word.

In FIG. 13b, the cutting to the shape which is ready for edging on the entire contour of the glazing is performed entirely at the first scoring workstation, without passing via the step of scoring "primitives" in a similar way to FIG. 12b.

The invention claimed is:

1. A method for breaking out a complex shape from a sheet of glass, the method comprising:
   tracing a score line on a surface of the glass, using a scoring tool;
   breaking out the glass using a local pressure system applied on an opposite face and opposite the score line, the local pressure system being moved and pressed along the score line on said opposite face,
   wherein a planar-support system is positioned on the side of the score line, directly opposite the local pressure system during the breaking-out,
   wherein a suction table is utilized as the planar-support system, the suction table supporting the sheet of glass by suction on a top face of the sheet of glass during the breaking-out or scoring, and
   wherein the tracing and the breaking-out are performed without turning the sheet of glass over between the tracing and the breaking-out.

2. The method as claimed in claim 1, wherein the breaking-out is performed through a deformable conveyor belt that conveys the sheet of glass.

3. The method as claimed in claim 1, wherein the local pressure system is mounted so that the local pressure system is rollable so as to roll along the sheet of glass.

4. The method as claimed in claim 1, wherein the local pressure system is a ball or a roller.

5. The method as claimed in claim 4, wherein the roller is a rounded roller.

6. The method as claimed in claim 1, wherein the local pressure system is pressed continuously along the score line.

7. The method as claimed in claim 1, wherein the local pressure system is pressed with a force that has a periodic intensity.

8. The method as claimed in claim 1, wherein the method is used to cut at least two imbricated and/or tangential complex shapes from the same sheet of glass.

9. A method for manufacturing a plurality of glazings of complex shape from a large-sized rectangular sheet of float glass having at least one dimension corresponding to a width of a ribbon of float glass from which the large-sized rectangular sheet of float glass is produced, the method comprising performing the method as claimed in claim 1 to cut out at least part of said glazings.

10. The method as claimed in claim 9, comprising:
   on a first workstation for scoring said sheet of glass, tracing at least one score line corresponding to at least one ready to shape edge of the glazings;
   performing a first breaking-out step;
   on a second scoring workstation, tracing at least one score line corresponding to at least one other ready to shape edge of the glazings, and
   performing a second breaking-out step.

11. The method as claimed in claim 9, comprising:
   on a first scoring workstation, tracing score lines corresponding to all of the ready to shape edges of the glazings,
   breaking out said ready to shape edges.

* * * * *